United States Patent
Cornog et al.

(10) Patent No.: US 7,545,957 B2
(45) Date of Patent: Jun. 9, 2009

(54) ANALYZING MOTION OF CHARACTERISTICS IN IMAGES

(75) Inventors: Katherine H. Cornog, Newburyport, MA (US); Randy M. Fayan, Medford, MA (US)

(73) Assignee: Avid Technology, Inc., Tewksbury, MA (US)

( * ) Notice: Subject to any disclaimer, the term of this patent is extended or adjusted under 35 U.S.C. 154(b) by 414 days.

(21) Appl. No.: 09/839,044

(22) Filed: Apr. 20, 2001

(65) Prior Publication Data

US 2002/0154792 A1   Oct. 24, 2002

(51) Int. Cl.
G06K 9/00 (2006.01)
(52) U.S. Cl. .................. 382/107; 382/103; 382/104
(58) Field of Classification Search ................ 382/104, 382/103, 107
See application file for complete search history.

(56) References Cited

U.S. PATENT DOCUMENTS

| | | | |
|---|---|---|---|
| 4,924,310 A | 5/1990 | von Brandt | |
| 5,182,633 A | 1/1993 | Antonio et al. | |
| 5,353,119 A | 10/1994 | Dorricott et al. | |
| 5,369,443 A | 11/1994 | Woodham | |
| 5,410,358 A | 4/1995 | Shackleton et al. | |
| 5,438,423 A | 8/1995 | Lynch et al. | |
| 5,469,226 A | 11/1995 | David et al. | |
| 5,568,200 A | 10/1996 | Pearlstein et al. | |
| 5,579,054 A | 11/1996 | Sezan et al. | |
| 5,594,676 A | 1/1997 | Greggain et al. | |
| 5,608,464 A | 3/1997 | Woodham | |
| 5,642,170 A | 6/1997 | Hackett et al. | |
| 5,654,771 A | 8/1997 | Takalp et al. | |
| 5,657,402 A | 8/1997 | Bender et al. | |
| 5,668,914 A | 9/1997 | Inuiya et al. | |

(Continued)

OTHER PUBLICATIONS

Bouthemy, P. "A Maximum Likelihood Framework for Determining Moving Edges", IEEE Transactions on Pattern Analysis and Machine Intelligence, vol. II, May 1989, pp. 499-511.*

(Continued)

Primary Examiner—Wesley Tucker
(74) Attorney, Agent, or Firm—Peter J. Gordon; Fish & Richardson; Oliver Strimpel

(57) ABSTRACT

In calculating motion between two images, a single channel image may be generated for each image based on measurement of a desired characteristic of those images. Given a desired characteristic (such as edge strength or edge magnitude) in an image, a function measures the strength of the desired characteristic in a region around a pixel in an image. A range of values can represent the likelihood, or measure of confidence, of the occurrence of the desired characteristic in the region around the pixel. Thus, each pixel in the single channel image has a value from the range of values that is determined according to a function. This function operates on a neighborhood in the input image that corresponds to the pixel in the single channel image, and measures the likelihood of occurrence of, or strength of, the desired characteristic in that neighborhood. Two single channel images generated from two input images are analyzed to provide a motion estimate that indicates how the location of characteristics in the images changes from one image to the next image. If the desired characteristic is an edge magnitude or edge strength, then the motion is effectively estimated using a constant edge constraint.

18 Claims, 4 Drawing Sheets

U.S. PATENT DOCUMENTS

| | | | |
|---|---|---|---|
| 5,673,207 | A | 9/1997 | Nomura |
| 5,727,080 | A | 3/1998 | Cox et al. |
| 5,748,761 | A | 5/1998 | Chang et al. |
| 5,802,220 | A | 9/1998 | Black et al. |
| 5,850,229 | A | 12/1998 | Edelsbrunner et al. |
| 5,880,788 | A | 3/1999 | Bregler |
| 5,920,657 | A | 7/1999 | Bender et al. |
| 5,929,919 | A | 7/1999 | De Haan et al. |
| 5,940,145 | A | 8/1999 | Burl |
| 5,943,445 | A | 8/1999 | Dufaux |
| 5,973,733 | A | 10/1999 | Gove |
| 5,982,389 | A | 11/1999 | Guenter et al. |
| 5,982,440 | A | 11/1999 | Aoki |
| 5,991,459 | A | 11/1999 | Fogel |
| 5,999,662 | A | 12/1999 | Burt et al. |
| 6,005,625 | A | 12/1999 | Yokoyama |
| 6,005,626 | A | 12/1999 | Ding |
| 6,016,152 | A | 1/2000 | Dickie .................... 345/436 |
| 6,075,818 | A | 6/2000 | Thomson |
| 6,081,606 | A | 6/2000 | Hansen et al. |
| 6,088,393 | A | 7/2000 | Knee et al. |
| 6,157,747 | A | 12/2000 | Szeliski et al. |
| 6,160,586 | A | 12/2000 | Justiss et al. |
| 6,246,961 | B1 * | 6/2001 | Sasaki et al. ................ 701/301 |
| 6,250,928 | B1 | 6/2001 | Poggio et al. |
| 6,370,196 | B1 | 4/2002 | Griessl et al. |
| 6,477,279 | B2 * | 11/2002 | Go ............................ 382/240 |
| 6,526,183 | B1 | 2/2003 | Bonnet et al. |
| 6,628,715 | B1 * | 9/2003 | Iu et al. ................ 375/240.16 |
| 6,665,450 | B1 * | 12/2003 | Cornog et al. .............. 382/276 |
| 2002/0159749 | A1 * | 10/2002 | Kobilansky .................... 386/1 |

OTHER PUBLICATIONS

David Marshall, "Optical Flow Printout", http://www.cs.cf.ac.uk/Dave/Vision—lecture/node45.html.*

Agrawala, Maneesh, et al., "Model-Based Motion Estimation for Synthetic Animations", ACM Multimedia 95 Electronic Proceedings, Nov. 5-9, 1995, pp. 1-25.

Barron., J.L. et al., "Performance of Optical Flow Techniques", IJCV 12:1, 1994, pp. 1-60.

Beauchemin, S.S., et al., "The Computation of Optical Flow", ACM Computing Surveys, vol.27, No.3, Sep., 1995, pp. 433-467.

Bergen, James R., et al., "Hierarchical Model-Based Motion Estimation", Proc. Euro. Conf. on Comp. Vision, Springer-Verlag, 1992, pp. 237-252.

Bergen, J.R., et al., "Hierarchical Motion-Based Frame Rate Conversion", David Sarnoff Research Center, Princeton, NJ, Apr. 1990, pp. 1-15.

Buxton, B.F., et al., "Computation of optic flow from the motion of edge features in image sequences", Image and Vision Computing, vol. 2, No. 2, May 1984, pp. 59-75.

Chen, Shenchange Eric., et al., "View Interpolation for Image Synthesis", Proc. SIGGRAPH 1993, pp. 279-288.

Ezzat, Tony et al., "Visual Speech Synthesis by Morphing Visemes", Massachusetts Institute of Technology, A.I. Memo No. 1658, CBCL Paper No. 173, May 1999, pp. 1-12.

Flomo Data Sheet, Time-warping software, Aug. 2000, 2 pages.

Gomes et al., "Time Warping of Audio Signals", in Proc. Comp. Graph.International (CGI 99), Jul. 1999, pp. 52-57.

Liu, Hongehe, et al., "Accuracy vs. Efficiency Trade-offs in Optical Flow Algorithms", Proc. 4th Eur.Conf. on Comp. Vision, Apr. 1996, vol. II, pp. 174-183.

Louchet, Jean, et al., "Building new tools for Synthetic Image Animation by using Evolutionary Techniques", Artificial Evolution '95, Proc. of the EA95 Workshop in Brest, France, Sep. 1995.

Lucas, Bruce, et al., "An Iterative Image Registration Technique with an Application to Stereo Vision", Proc. 7th Int'l.Jt.Conf. on AI, 1981, pp. 674-679.

Teodosio, Laura, et al., "Salient Video Stills: Content and Context Preserved", Proc. 1st Int'l.Conf. on Multimedia, Aug. 1993, pp. 39-46.

Schodl, Arno, et al., "Video Textures", Proc. SIGGRAPH 2000, 2000, pp. 489-498.

* cited by examiner

ANALYZING MOTION OF CHARACTERISTICS IN IMAGES

BACKGROUND

There are many ways in which motion may be estimated between two images. This motion may be described by a set of motion parameters that describe motion of luminance of pixels from a first image to a second image. These motion parameters may be defined at a time associated with either or both of the first and second images, or may be defined at a time between the first and second images. Thus, a vector for each pixel describes the motion of the luminance of the pixel from one image to the next. Motion also may be described by a parameterized motion model, which may be translational, using two parameters, affine, using six parameters, or projective, using eight parameters, and that is defined for a region of an image, or an entire image. An estimate of a single parameterized motion model for a user-defined region of an image is useful for stabilization and tracking applications. An estimate of translational motion for every pixel in the image may be used for sample rate conversion and morphing applications. This motion estimate may be computed by using a gradient-based method, of which an example is a technique referred to as computing the "optical flow" between the images, or by using a correlation-based method.

Such motion parameters may be estimated by relying on what is known as a constant brightness constraint. The assumption is that the total luminance from one image to the next is constant. Two images, for example in RGB format, are converted from the existing format to a single luminance component, typically the luminance component of a YCrCb format image. Parameters are first estimated on a reduced resolution image, then propagated to a higher resolution version of the image. Details about implementations of such motion analysis may be found in several references, including, but not limited to "Hierarchical Model-Based Motion Estimation," by J. R. Bergen et al., in *Proceedings of Second European Conference on Computer Vision*, pages 237-252, Springer-Verlag, 1992; and "Hierarchical Model-Based Frame Rate Converstion," by J. R. Bergen et al, Technical Report, David Sarnoff Research Center, 1990; and "The Computation of Optical Flow, by S. S. Beauchemin and J. L. Barron, *ACM Computing Surveys*, Vol. 27, No. 3, September 1995, pp. 433-467, which are hereby incorporated by reference.

SUMMARY

In some neighboring images in a video or film sequence, the constant brightness constraint does not hold. Such a condition may arise because of a change in an object's position relative to light sources, an object's specularity, an overall luminance change, or a lack of similarity between the images. In calculating motion between two images, instead of generating an image of a single component comprised of the luminance component of an image, a single channel image may be generated from the image based on some other desired characteristic. Given a desired characteristic (such as edge strength or edge magnitude) in an image, a function measures the strength of the desired characteristic in a region around a pixel in an image. A range of values can represent the likelihood, or measure of confidence, of the occurrence of the desired characteristic in the region around the pixel. Thus, each pixel in the single channel image has a value from the range of values that is determined according to a function. This function operates on a neighborhood in the input image that corresponds to the pixel in the single channel image, and measures the likelihood of occurrence of, or strength of, the desired characteristic in that neighborhood. Two single channel images generated from two images are analyzed to provide a motion estimate that indicates how the location of characteristics in the images changes from one image to the next image. If the desired characteristic is an edge magnitude or edge strength, then the motion is effectively estimated using a constant edge constraint.

Accordingly, in an aspect, motion analysis is performed on two images by generating a single channel image for each of the two input images according to a function that measures, for each pixel, occurrence of a desired characteristic, other than luminance alone, in the input images at each pixel location to provide a value for an output pixel in the single channel image from a range of values. An estimate of motion of the desired characteristic between the two images is computed using the single channel images generated for the two input images. The input images may be processed according to the estimate of motion. The desired characteristic may be edge magnitude. The estimate of motion may be used to process the input images to generate several images from the first image to the second image.

In another aspect, image processing is performed on two images by computing an estimate of motion between the two images according to a constant edge constraint. The images may be processed according to the estimate of motion.

DETAILED DESCRIPTION

Figure 1:
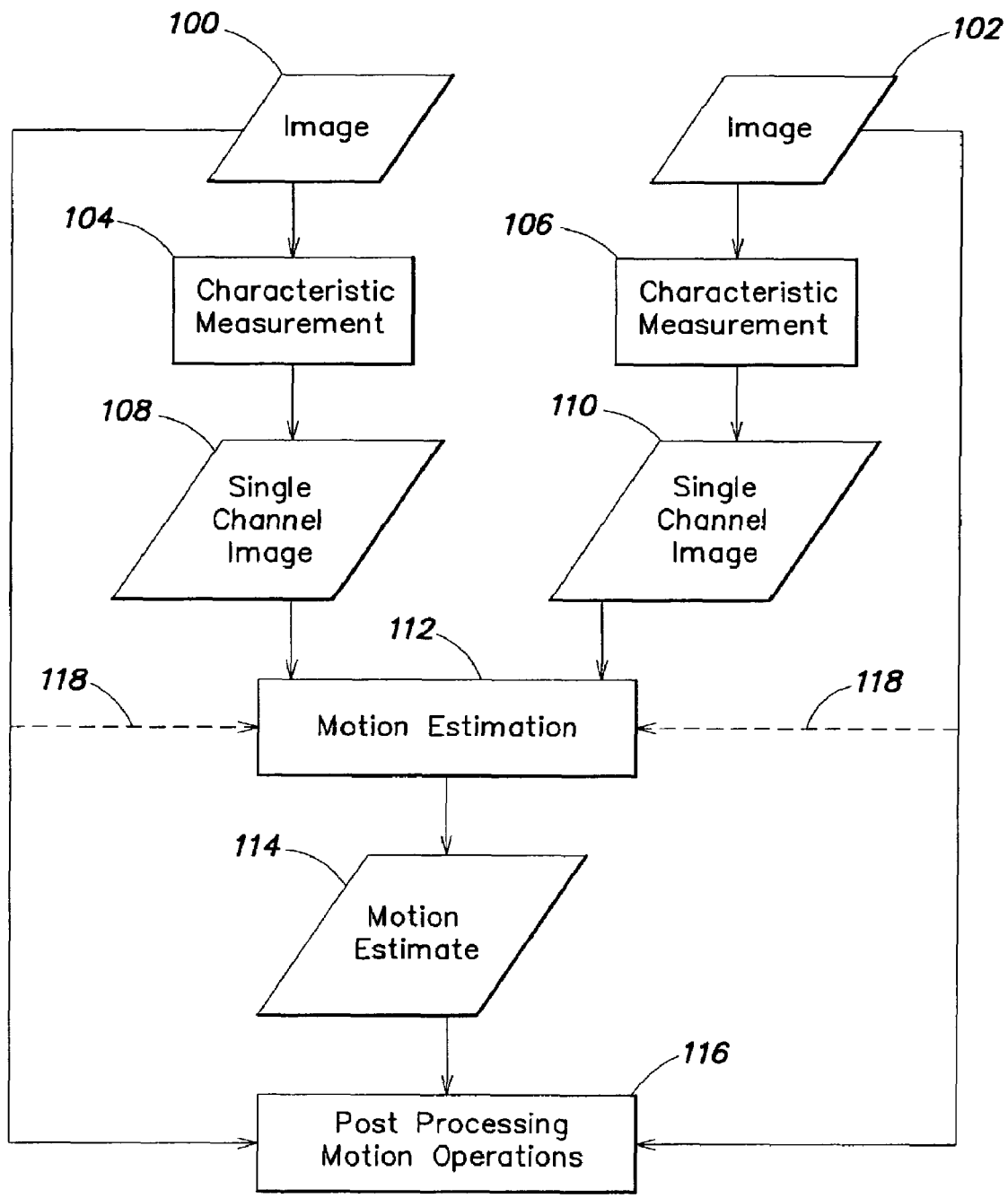
FIG. 1 is a dataflow diagram of a system that analyzes motion of characteristics in images.

FIG. 1 is a dataflow diagram of a system that analyzes motion of characteristics in images. In FIG. 1, each image 100, 102 is processed by characteristic measurement processors 104, 106 respectively, to produce a single channel image 108, 110 based on a desired characteristic of that image. Although two characteristic measurement processors are shown, the images could be processed serially by one characteristic measurement processor.

The characteristic measurement processor implements a function, examples of which are provided below, that measures the occurrence of a desired characteristic in a region around a pixel in an image. A range of values can represent the likelihood, or measure of confidence, of the occurrence of the desired characteristic in the region around the pixel. Thus, each pixel in the single channel image has a value from the range of values that is determined according to a function. This function operates on a neighborhood in the input image that corresponds to the pixel in the single channel image, and measures the likelihood of occurrence of, or strength of, the desired characteristic in that neighborhood.

Two single channel images 108, 110 generated from the two input images 100, 102 are analyzed by a motion estimation process 112 to provide a motion estimate 114 that indicates how the location of a characteristic changes from one image 100 to the next image 102. The motion estimation process 112 also may use the original input images as indicated at 118, in a manner described below in connection with FIG. 2. The motion estimation may be based on optical flow, such as described in the references noted above, or other equivalent motion estimation process. Such computations generally are gradient-based or correlation-based. The motion estimate may be in the form of a per-pixel vector map, or any conventional motion model, such as a model for a region of an image or a model for the entire image.

After the motion estimate 114 is computed, the motion estimate 114 maybe used to perform post processing motion operations 116, such as warping, morphing, motion bluffing, stabilization, image sharpening, mosaic generation or other effects, on the input images 100, 102. Various post-processing operations, and methods for computing optical flow, are described in application Ser. No. 09/657,699, filed Sep. 8, 2000, and entitled "Interpolation Of A Sequence Of Images Using Motion Analysis," now U.S. Pat. No. 6,665,450, and application Ser. No. 09/838,868, filed Apr. 20, 2001, entitled "Correcting Motion Vector Maps for Image Processing" now pending, and application Ser. No. 09/839,160, filed Apr. 20, 2001, entitled "Interpolation of a Sequence of Images Using Motion Analysis" now U.S. Pat. No. 6,570,624, and hereby incorporated by reference.

Figure 2:
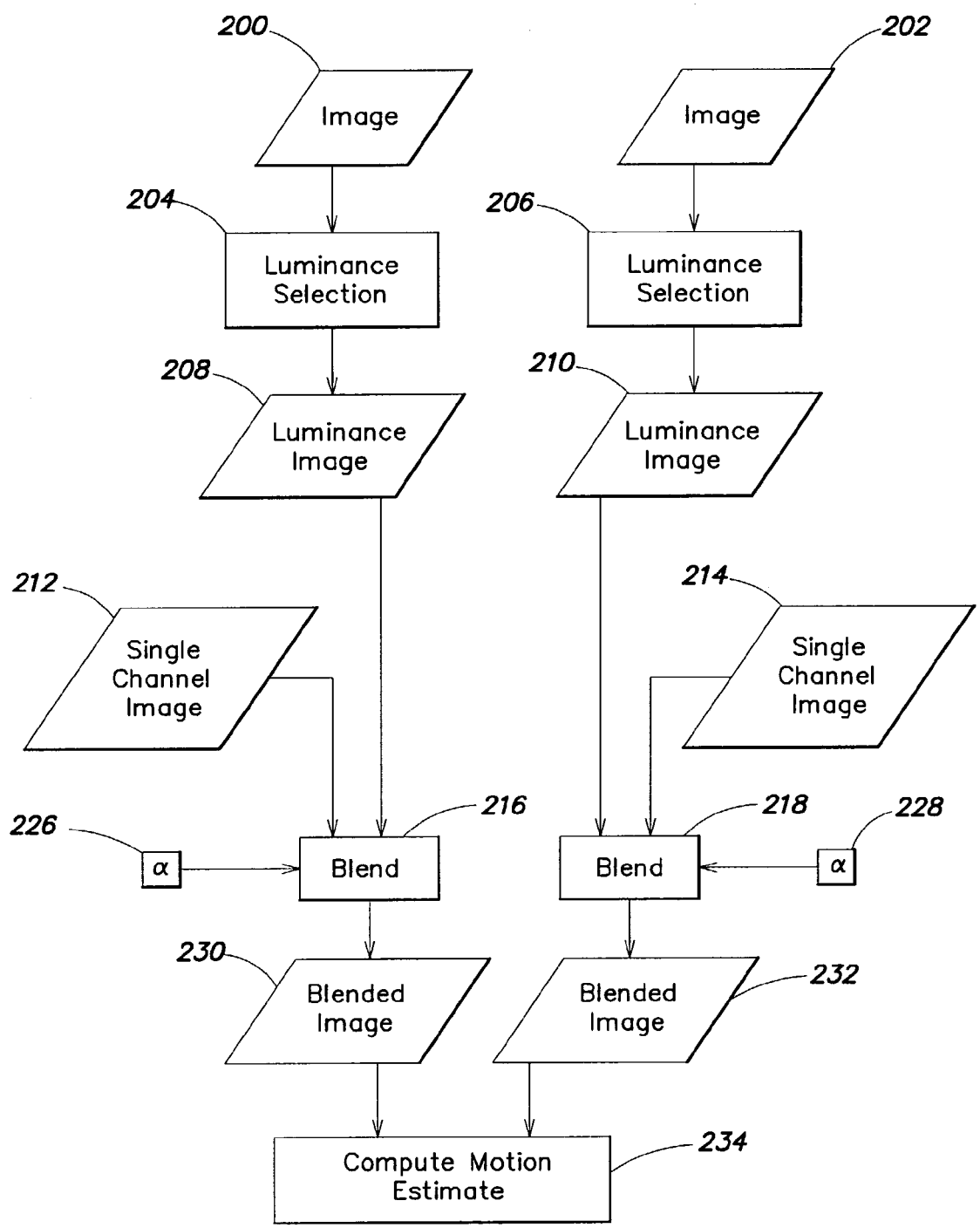
FIG. 2 is a dataflow diagram illustrating more detail of an example computation of a motion estimate.

FIG. 2 is a dataflow diagram illustrating more detail of an example computation of a motion estimate that may use both the input images 100, 102 (FIG. 1) and the single channel images 108, 110 (FIG. 1). The input images 200, 202 are processed by luminance selection 204, 206 to generate a luminance or grey-scale image 208, 210. The luminance images 208, 210 are blended with their respective single channel images (based on characteristic measurement) 212, 214 (see 108, 110 in FIG. 1) by blend operations 216, 218 to produce output images 230, 232. The blend operations may be implemented, for example, by a typical alpha blend of the function $C_{x,y} = \alpha A_{x,y} + (1-\alpha)B_{x,y}$, where $C_{x,y}$ is a pixel at coordinates (x,y) in the output image, $\alpha$ is a blend value in the range of zero to one, $A_{x,y}$ is a pixel in one of the input images, and $B_{x,y}$ is a pixel in the other of the input images. The blend value $\alpha$ (226, 228) may be specified by a user through any conventional user interface technique for obtaining user input. If $\alpha=0$ or $\alpha=1$, one of the images input to the blend is output, and the other image has no contribution to that output.

The blended images 230, 232 are used to compute a motion estimate, as indicated at 234. As noted above, the motion estimation 234 may be based on optical flow, such as described in the references noted above, or other equivalent motion estimation. The motion estimate may be in the form of a per-pixel vector map or any conventional motion model, such as a parameterized model for a region of the image or for the entire image.

Examples of the kinds of characteristics that may be measured by characteristic processors 104, 106 in FIG. 1 will now be described. Characteristics for which it might be desirable to estimate motion include characteristics such as edge magnitude, proximity to a selected color, or other characteristics. In general, a function that describes the likelihood of occurrence or measure of the strength of the characteristic, over a range of values, is used to generate a single channel image. The range of values may be, for example, a discrete integer range (e.g., 0 to 255) or a range of fractional values expressed in fixed-point or floating-point format.

By measuring edge magnitude, for example, some artifacts generated by using optical flow based only on luminance may be reduced or eliminated. For example, with images that have structurally similar but visually dissimilar features, the results from image processing based on motion estimated using optical flow can be poor. By measuring optical flow based on edge magnitude, a better match of the structures of the two images may be obtained.

An example characteristic measurement processor that measures edge magnitude will now be described. In this example, each of the input images is processed to create an edge magnitude image, indicative of the strength of an edge at each pixel in the image. The edge magnitude is computed by combining the output of differential operators, called horizontal and vertical edge operators. Linear and nonlinear post processing of the edge magnitude images may be applied to adaptively center the edge magnitude in a specified range. The sign of the edge magnitude may be retained as well, for avoiding matching of light to dark transitions with dark to light transitions.

The following formulas describe the edge magnitude operation as it is performed for each pixel in an input image, to obtain values del1 and del2 that represent the edge magnitude. A first embodiment, described using MATLAB notation, is as follows:

$$del1 = sqrt(dx1.*dx1+dy1.*dy1);$$

$$del2 = sqrt(dx2.*dx2+dy2.*dy2);$$

where dx1 is the x derivative of the first image, dy1 is the y derivative of the first image, dx2 is the x derivative of the second image, and dy2 is the y derivative of the second image. Each derivative may be calculated based on a 3-tap filter centered on the pixel, with coefficients of zero for the center tap and 0.5 and −0.5 for the taps for the adjacent pixels. Other derivative filters may be used.

Another method for computation of edge magnitude is as follows:

$$del1 = abs(dx1)+abs(dy1);$$

$$del2 = abs(dx1)+abs(dy1);$$

where dx1 is the x derivative of the first image, dy1 is the y derivative of the first image, dx2 is the x derivative of the second image, and dy2 is the y derivative of the second image.

The edge magnitude for each pixel optionally may be post processed to normalize it in the range (e.g. 8-bits) of an image. For example, a scale factor may be computed and applied for each pixel as follows:

$$md = mean(del1(:)+del2(:))/2;$$

$$stdd = std(del1(:)+del2(:))/2;$$

$$psi = 4;$$

$$scale = 255/(md+psi*stdd);$$

$$offset = 0;$$

$$b1 = scale*del1+offset; \text{ and}$$

$$b2 = scale*del2+offset,$$

where b1 and b2 are the normalized versions of the edge magnitude images.

Figure 4:
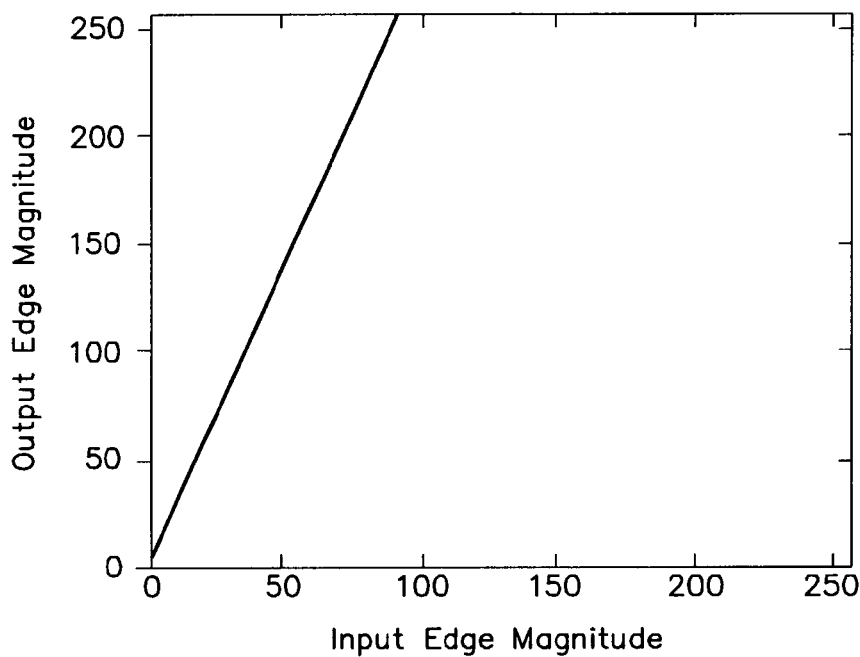
FIG. 4 is a graph of a function that performs linear post-processing of edge magnitude.
Figure 5:
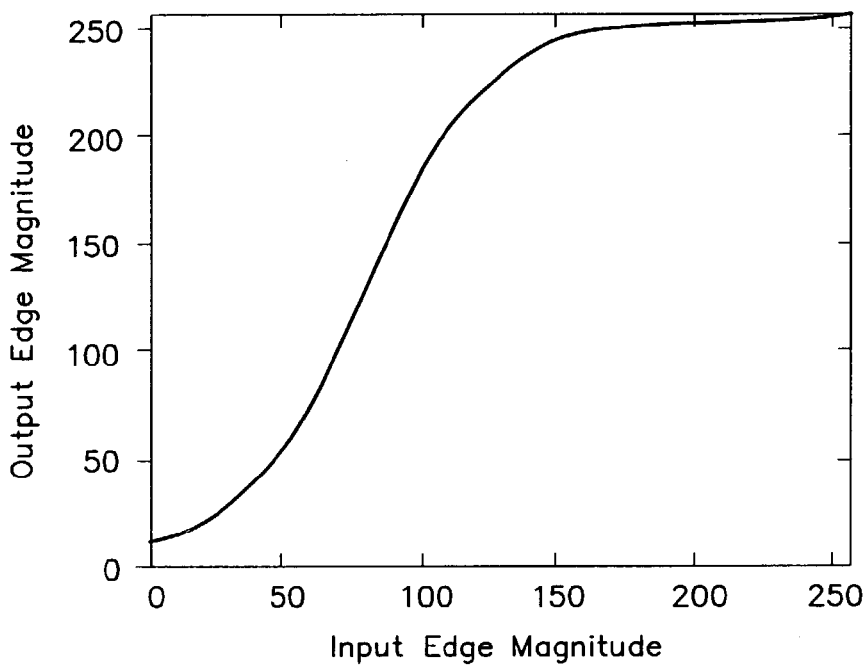
FIG. 5 is a graph of a function that performs nonlinear post-processing of edge magnitude.

After optional scaling, the values are clipped to the range by limiting all values that are less than the minimum (e.g., zero) to the minimum and all values greater than the maximum (e.g., 255) to the maximum. Further post processing may be optionally applied to enhance contrast and reduce the effect of low amplitude edges. The a linear function may be applied, such as shown in FIG. 4. A nonlinear function also may be used, such as described by the following formula. The values of alpha and beta may vary in these formulas.

$$m = \text{mean}(b1(:)+b2(:))/2;$$

$$\text{sigma} = \text{std}(b1(:)+b2(:))/2;$$

$$\text{alpha} = 1.5;$$

$$\text{beta} = 0.1$$

$$c1 = 255./(1 + \exp(-(b1 - \text{alpha}*m)./(\text{beta}*\text{sigma}))); \text{ and}$$

$$c2 = 255./(1 + \exp(-(b2 - \text{alpha}*m)./(\text{beta}*\text{sigma}))),$$

where c1 and c2 are the versions of the edge magnitude images that have been post-procesed. FIG. 5 illustrates a graph of such a function.

Figure 3:
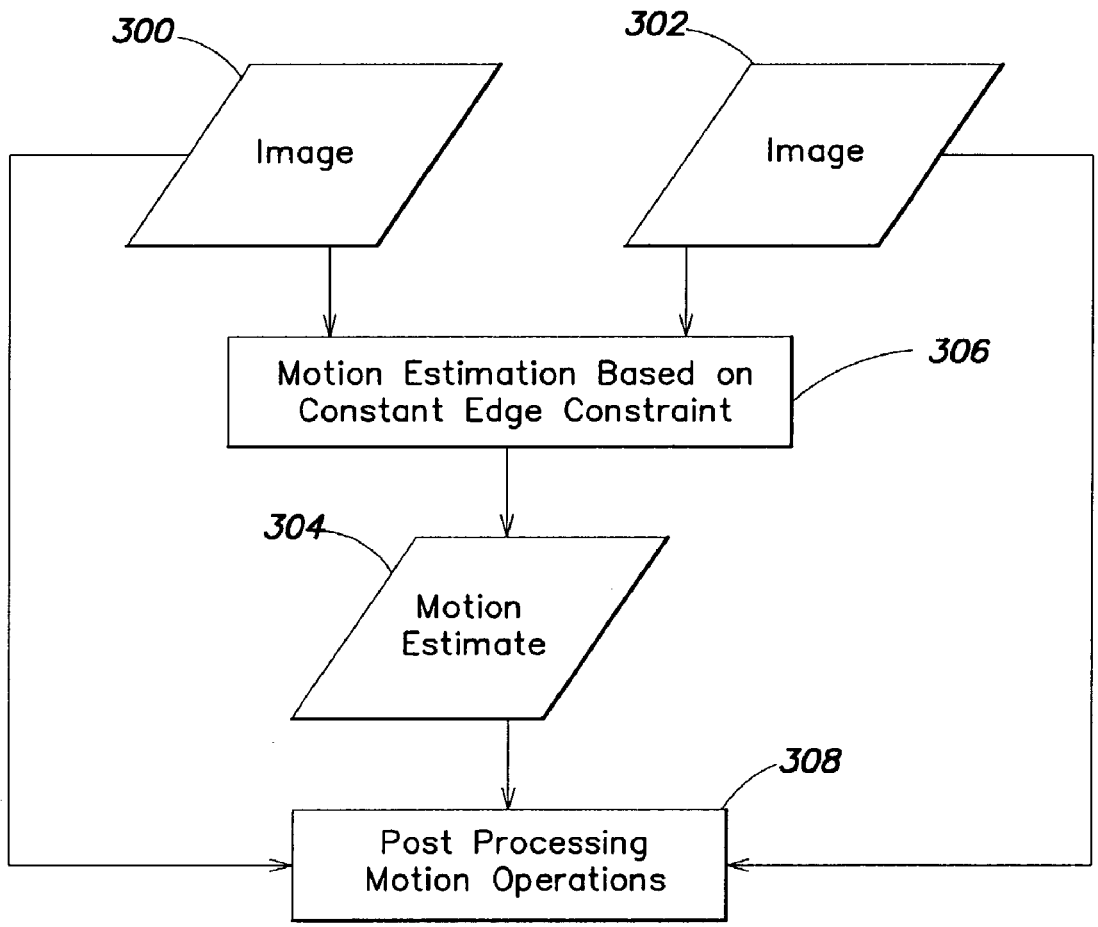
FIG. 3 is a dataflow diagram of a system that analyzes motion based on a constant edge constraint.

By processing the input images to determine edge magnitude, and processing optical flow on the edge magnitude of the input images, the effect is that optical flow is computed based on a constant edge constraint as opposed to a constant brightness constraint. Therefore, as shown in FIG. 3, a system is provided that receives input images 300, 302 and determines a motion estimate 304 using a motion estimation process 306 based on a constant edge constraint. The input images 300, 302 may be processed by a post-processing operations 308 using the motion estimate so generated.

Another example of another characteristic that may be measured is proximity to a specified color. Proximity is a measure of distance or similarity of two colors in a color space. A single channel image may be generated from an input image such that a pixel in the input image that is equal to the specified color is converted to a pixel in an output image at one extreme of the range of output values, e.g., a value representative of white. All other pixels in the input image are converted to pixels in the output image that have a value representative of their distance from the specified color.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for applying a motion effect using two input images, comprising:
   generating a single channel image for each of two input images according to a function that measures, for each pixel, occurrence of a desired characteristic, other than luminance alone, in the input images at each pixel location to provide a single value for each output pixel in the single channel image from a range of values that represent a likelihood of the occurrence of the desired characteristic;
   computing an estimate of motion of the desired characteristic between the two input images based on the single channel images generated for the two input images; and
   processing at least one of the two input images to generate an output image that includes a motion-based effect, wherein the processing uses the computed estimate of motion of the desired characteristic.

2. The method of claim 1, wherein the desired characteristic is edge magnitude.

3. The method of claim 1, wherein the desired characteristic is proximity to a color; and the function measures the proximity to a color of a region around each pixel location.

4. The method of claim 1, wherein performing the motion-based effect includes generating several images from the two input images according to an interpolation of the computed estimate of motion over time between the two images.

5. The method of claim 4, wherein the desired characteristic is edge magnitude.

6. The method of claim 4, wherein:
   the desired characteristic is proximity to a color; and
   the function measures the proximity to a color of a region around each pixel location.

7. An apparatus for applying a motion effect using two input images, comprising;
   a processor system; and
   a memory storing code which, when executed on the processor system causes the apparatus to:
   generate a single channel image for each of two input images according to a function that measures, for each pixel, occurrence of a desired characteristic, other than luminance alone, in the input images at each pixel location to provide a single value for each output pixel in the single channel image from a range of values that represent a likelihood of the occurrence of the desired characteristic;
   compute an estimate of motion of the desired characteristic between the two images using the single channel images generated for the two input images; and
   process at least one of the two input images to generate an output image that includes a motion-based effect, wherein the processing uses the computed estimate of motion of the desired characteristic.

8. The apparatus of claim 7, wherein the desired characteristic is edge magnitude.

9. The apparatus of claim 7, wherein the desired characteristic is proximity to a color.

10. The apparatus of claim 7, wherein the means for performing generating a motion-based effect includes means for generating several images from the two input images according to an interpolation of the computed estimate of motion over time between the two images.

11. The apparatus of claim 10, wherein the desired characteristic is edge magnitude.

12. The apparatus of claim 10, wherein;
   the desired characteristic is proximity to a color; and
   generating the single channel image involves measuring the proximity to a color of a region wound each pixel location.

13. The method of claim 1, wherein computing the estimate of motion uses a gradient-based method that uses the single channel images generated for the two input images and a constraint that a total of the desired characteristic is constant from one image to a next image, and wherein the gradient-based method comprises computing optical flow for the single channel images.

14. The apparatus of claim 7, wherein the estimate of motion uses a gradient-based method that uses the single channel images generated for the two input images and a constraint that a total of the desired characteristic is constant from one image to a next image, and wherein the gradient-based method includes computing optical flow for the single channel images.

15. The method of claim 13, wherein the gradient-based method comprises computing, for each pixel in an image, a vector that describes the motion for the pixel from one image to the next.

16. The apparatus of claim 14, wherein the estimate of motion using a gradient-based method comprises computing, for each pixel in an image, a vector that describes the motion for the pixel from one image to the next.

17. The method of claim 13, wherein the gradient-based method comprises using an optical flow constraint equation.

18. The apparatus of claim 14, wherein the estimate of motion using a gradient-based method comprises using an optical flow constraint equation.

* * * * *